(12) United States Patent
Wisnovsky

(10) Patent No.: US 10,579,368 B2
(45) Date of Patent: Mar. 3, 2020

(54) BLOCKCHAIN VERSION CONTROL SYSTEMS

(71) Applicant: salesforce.com, inc., San Francisco, CA (US)

(72) Inventor: Peter Wisnovsky, Oakland, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 123 days.

(21) Appl. No.: 15/456,278

(22) Filed: Mar. 10, 2017

(65) Prior Publication Data

US 2018/0260212 A1 Sep. 13, 2018

(51) Int. Cl.
*G06F 8/71* (2018.01)
*G06F 16/23* (2019.01)
*H04L 29/06* (2006.01)

(52) U.S. Cl.
CPC ............ *G06F 8/71* (2013.01); *G06F 16/2365* (2019.01); *H04L 63/0428* (2013.01)

(58) Field of Classification Search
CPC ....... G06F 8/71; G06F 17/30371; H04L 9/06; H04L 9/0643; H04L 63/0428
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |

(Continued)

FOREIGN PATENT DOCUMENTS

WO WO-2017155742 A1 * 9/2017 ....... G06F 17/30864

*Primary Examiner* — Wei Y Zhen
*Assistant Examiner* — Amir Soltanzadeh
(74) *Attorney, Agent, or Firm* — Schwabe Williamson & Wyatt

(57) ABSTRACT

Distributed version control systems, methods, and computer-readable media are described. A computer system may implement a version control blockchain system by obtaining source code and/or an artifact associated with source code. The computer system may serialize the source code and/or the artifact to obtain serialized data, and may encipher the serialized data to obtain a current block identifier (cb_id). The computer system may generate a block to include the cb_id, and may add the generated block to the version control blockchain upon validation of the block. Other embodiments may be described and/or claimed.

18 Claims, 6 Drawing Sheets

(56) References Cited

U.S. PATENT DOCUMENTS

| | | |
|---|---|---|
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0023931 A1* | 1/2010 | Cheng .................. G06F 8/433 717/156 |
| 2011/0218958 A1 | 9/2011 | Warshaysky |
| 2011/0247051 A1 | 10/2011 | Bulumulla |
| 2012/0042218 A1 | 2/2012 | Cinarkaya |
| 2012/0233137 A1 | 9/2012 | Jakobson et al. |

(56) References Cited

U.S. PATENT DOCUMENTS

| | | |
|---|---|---|
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2016/0028552 A1* | 1/2016 | Spanos ................ H04L 9/3297 713/178 |
| 2018/0039667 A1* | 2/2018 | Pierce ................ G06Q 20/0658 |
| 2018/0189732 A1* | 7/2018 | Kozloski ................ G06F 8/30 |

* cited by examiner

BLOCKCHAIN VERSION CONTROL SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to blockchain distributed databases, and in particular to managing schema evolution for distributed software development based on blockchain technologies.

BACKGROUND

In multi-tenant database systems, customer organizations (also referred to as "tenants") may share database resources in one logical database. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields. The owner/operator of a multi-tenant database system may provide software development platforms (SDPs), integrated development environments (IDEs), software development kits (SDKs), etc. to allow tenants to designate the custom fields and otherwise configure their tenant space within the multi-tenant database system. The owner/operator of a multi-tenant database system may also provide a pre-built and customizable query application for use by agents of the tenants so that these agents can access and/or edit data in the tenant's tenant space. In these cases, the owner/operator of a multi-tenant database system may provide SDPs, IDEs, SDKs, and/or application programming interfaces (APIs) to allow the tenants to customize the query applications. However, organizing and/or controlling revisions to the tenant space configurations and/or revisions to the query applications can be difficult, especially when a tenant uses a relatively large team of developers/administrators to customize the tenant space and/or query applications.

Typical source code management solutions may allow teams of developers to share a central repository of code and declarative structures expressed in source files. These management solutions also allow developers to make changes to source files, merge files containing these structures made by other developers together, and serve the needs of systems for building and releasing software products. In many cases, these management solutions may be SDPs that other third party developers, who do not have access to the source repository, need to use to create their own products. However, typical source code management solutions do not contain mechanisms to ensure that rules, which ensure the structural compatibility of changes/revisions from one release to the next, are respected. The failure to adhere to such rules may be referred to as a "schema evolution" problem. Some solutions to schema evolution problems include publishing development rules so that developers may develop code that complies with the development rules. However, eternalizing the schema evolution rules means that they can themselves be modified as source by developers, providing no guarantee of compatibility. Conversely, while a source code management platform can make use of a centralized online service to ingest various versions of source files to validate them against tables of development rules, such solutions may force all development online, and therefore, may preclude disconnected development. This may burden the rules tables to model the external branching structure of the source code system to ensure that the correct manifest of source files is referenced.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
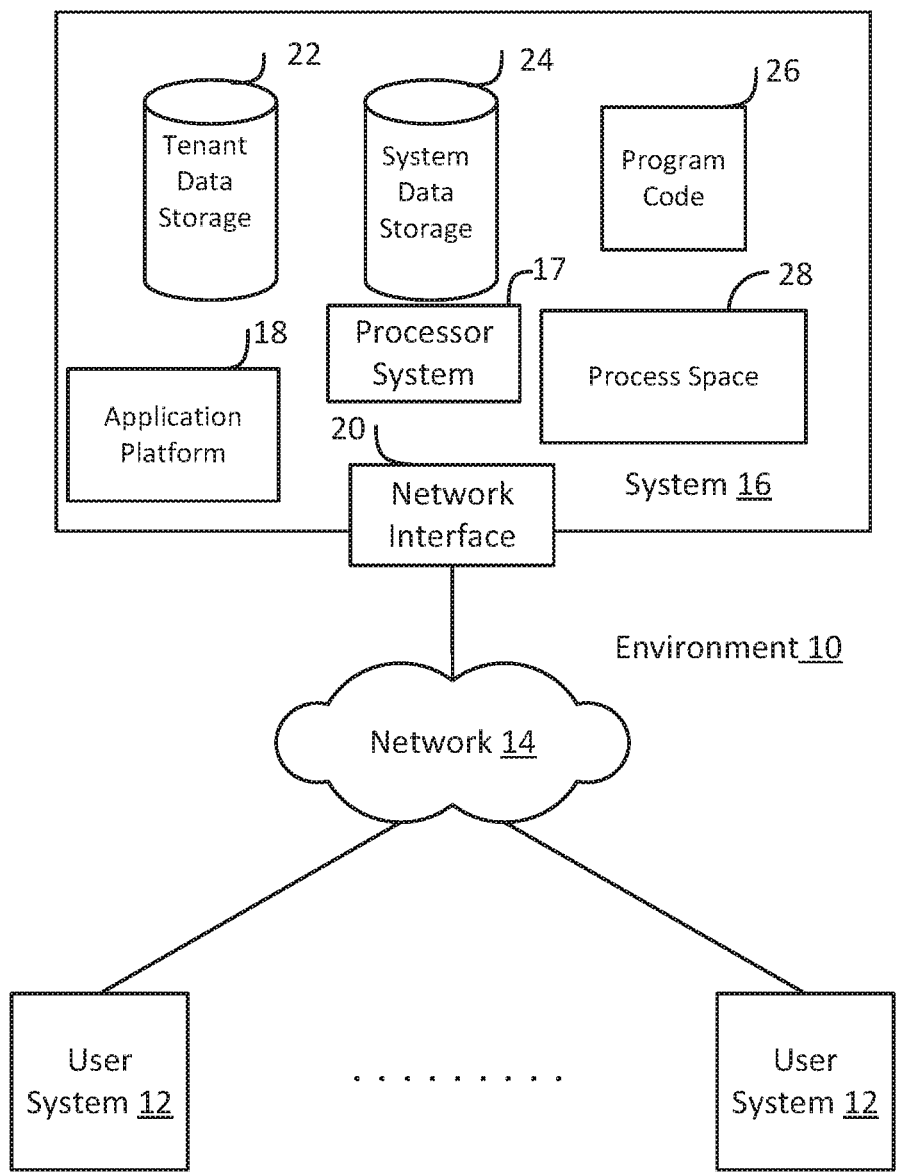
FIG. 1A shows a block diagram of an example environment in which an on-demand database service can be used according to some implementations.

Embodiments discussed herein are directed to managing schema evolution for distributed software development environments based on blockchain technologies. In embodiments, a rule table may be serialized externally to a centralized online service, such as a multi-tenant database system, which validates new or edited records using blockchain technologies. Using blockchain technologies, the service may ensure that new/edited records cannot be accepted for appending to a sequence of changes (e.g., a blockchain, etc.) without respecting a prior history of versions and compatibility rules. In some embodiments, new/edited records may only be accepted when an entire history of a blockchain is included in the new/edited record. In embodiments, records that include a stamp or other identifier of a release history of one or more source artifacts may be expressed as a database record and serialized into a block of change records; these blocks may then be signed and chained together using an untamperable key. In this way, developers may not add or change records that do not contain a history of the chained records back to the beginning of the release.

In embodiments, a central service may ingest these changes and may ensure that a single trunk branch of source changes is managed in lockstep with the rules table such that only one successor to each block of change records is permitted. This may force reconciliation of the changes back onto the implementor to ensure the release history is respected. In other embodiments, the central service may permit other branch topologies as desired or based on various schema development policies. In some embodiments, a distributed architecture may be implemented where one or more user systems perform the tasks of a centralized service, such as by validating blocks for addition to the blockchain to ensure that a single trunk branch of source changes is managed in accordance with a distributed rules table such that only one successor to each block of change records is permitted.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
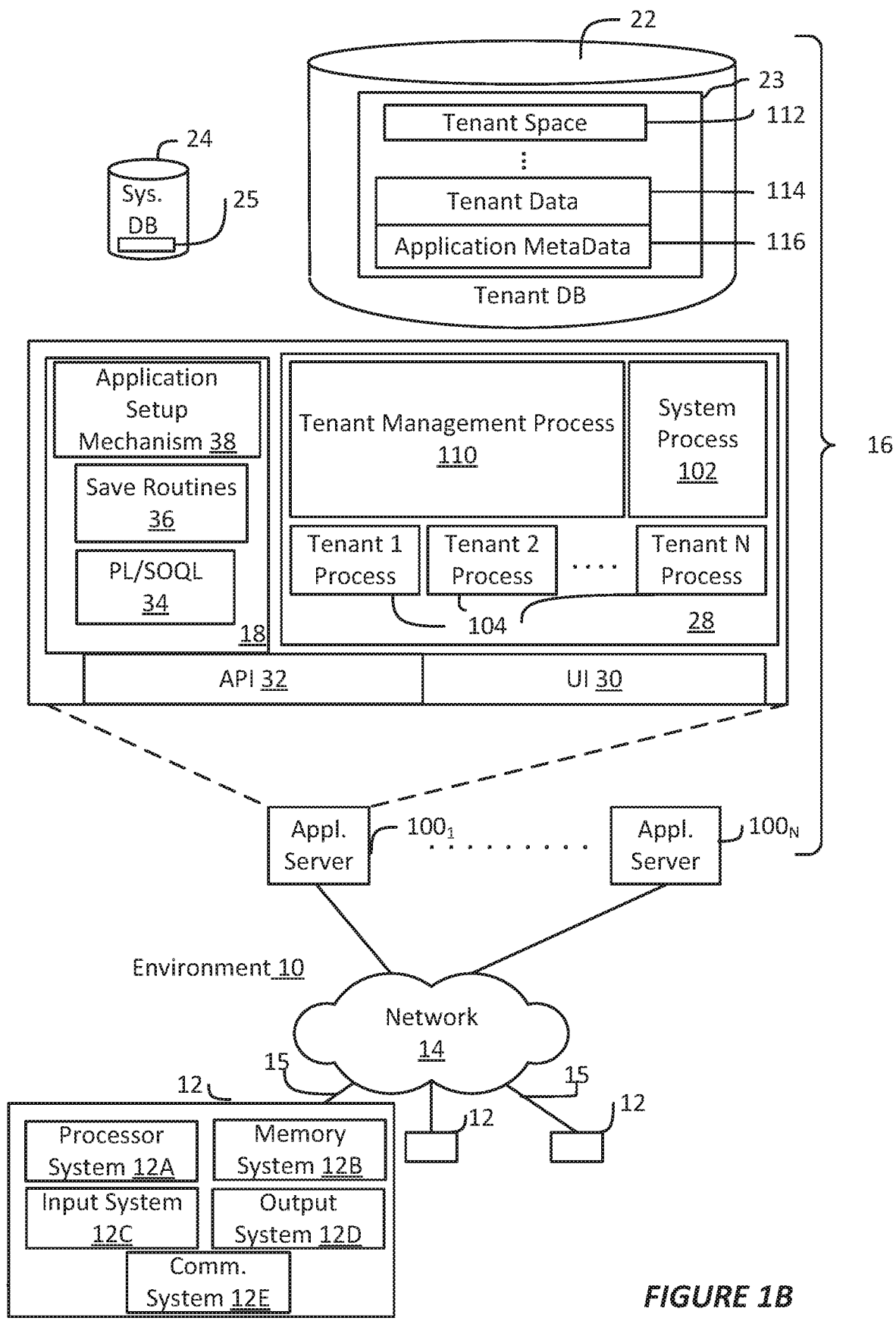
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors, one or more graphics processing units (GPUs), one or more field-programmable gate arrays (FPGAs), or any other electronic circuitry capable of executing program code and/or software modules to perform arithmetic, logical, and/or input/output operations. The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks. The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches, filters, amplifiers, antenna elements, and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
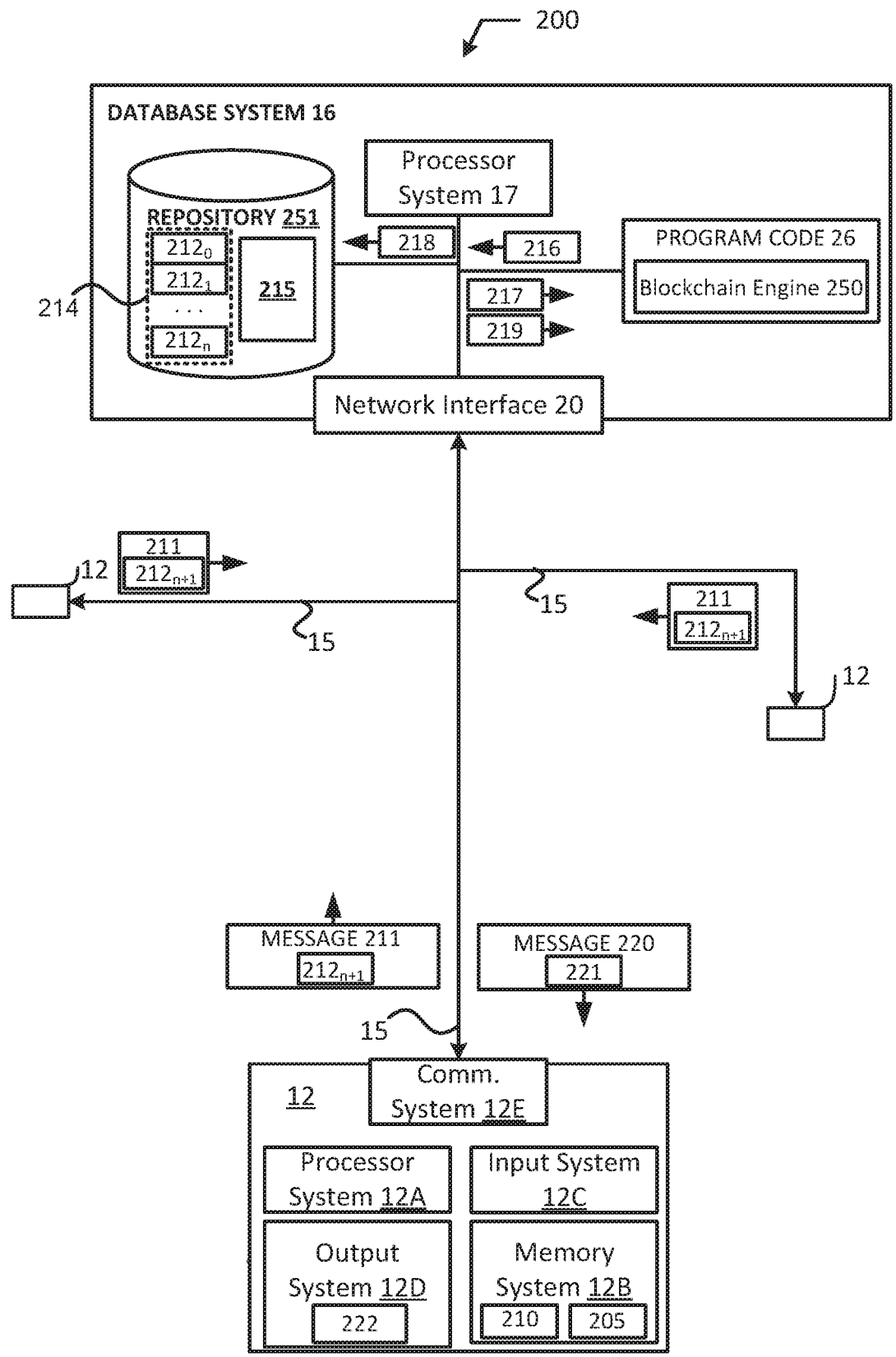
FIG. 2 shows an arrangement in which components of a user system interact with components of a database system, in accordance with various embodiments.

FIG. 2 shows an arrangement 200 in which the components of a user system 12 interact with components of the database system 16, in accordance with various example embodiments. As shown, the user system 12 may include the processor system 12A, the memory system 12B, the input system 12C, the output system 12D, and the communications system 12E discussed previously with regard to FIGS. 1A and 1B. The database system 16 may include the processor system 17, the network interface 20, the database 22, and the program code 26 as discussed previously with regard to FIGS. 1A and 1B.

Referring to the user system 12, the memory system 12B may include an operating system (OS) (not shown), environment 205, application 210, and one or more databases (not shown). OS may manage computer hardware and software resources, and provide common services for applications of the user system 12. OS may include one or more drivers and/or APIs that provide an interface to hardware devices thereby enabling OS and application 210 to access hardware functions. In some embodiments, the OS may include middleware that may connect two or more separate applications or connect applications with underlying hardware components beyond those available from OS and/or the drivers/APIs. The OS may be a general purpose operating system or an operating system specifically written for and tailored to the user system 12.

The application 210 may be a software application designed to run on the user system 12, such as when the user system 12 is implemented in a mobile device, such as a smartphone, tablet computer, and the like. The processor system 12A implementing the application 210 may be capable of requesting and obtaining data from database system 16, and rendering graphical user interfaces (GUIs) in a container of application 210 or a web browser. In various embodiments, the webpages and/or GUIs may include a data analytics GUI, such as Salesforce Wave™ dashboard, which may provide visual representations of data residing in an enterprise cloud or in an on-demand services environment (e.g., a tenant space within database system 16). The application 210 may be a native application, a web application, or a hybrid application (or variants thereof) that is developed using the environment 205. Application 210 may also be developed with, (or configured to interact with) other tools/programming languages, such as those discussed herein.

The environment 205 may be a software development environment (SDE), an integrated development environment (IDE), a software development kit (SDK), a software development platform (SDP), or other like platform or framework that allows tenant developers to create applications (e.g., application 210) for accessing a tenant space. In embodiments, the environment 205 may comprise a source code editor, build automation tools, debugger, compiler, interpreter, and/or other like tools that may assist a developer in building an application. In embodiments, the environment 205 may also comprise a schema builder that may provide a GUI developing and editing one or more schemas 313b (see e.g., FIG. 3), which may be a graph or other like structure that describes a structure of one or more database objects or other like organization of data. The GUI of the schema builder may allow a developer to view and modify data models including relationships between various records, fields, and elements within one or more database objects. In embodiments, the environment 205 may provide various tools (e.g., a modeling language application, etc.) that allow developers to generate and modify one or more artifacts 313 (see e.g., FIG. 3), which may include use/business case analyses, project plans, risk assessments, etc.; class diagrams; flow chart(s); system diagram(s); compiled source code; schema(s) (e.g., Extensible Markup Language (XML) schema, Document Type Definitions (DTDs), Relax-NG, Schematron, XML Schema Definitions (XSD), etc.); object model(s) (e.g., Document Object Model (DOM), Java Object Model, Rudy Object Model, etc.); and/or other like artifacts associated with source code. In embodiments, the artifacts 313 may additionally or alternatively include source code itself.

In some embodiments, the environment 205 may be a web-based or cloud-based environment, which may be a native application, a web application, or a hybrid application (or variants thereof). The web-based or cloud-based environment 205 may include a GUI, which renders an SDE/IDE/SDK/SDP implemented by a backend service (e.g., database system 16, a cloud service provider, etc.) in a web browser or container implemented by the user system. The GUI may allow developers to access various development tools using, for example, the communications protocols and/or APIs discussed herein. The client-side portion of the web-based or cloud-based environment 205 may be developed with server-side development tools and/or programming languages, such as PHP, Node.js, ASP.NET, and/or any other like technology that renders HTML; using website development tools and/or programming languages, such as HTML, Cascading Stylesheets (CSS), JavaScript, JQuery, and the like; and/or using platform-specific development tools and/or programming languages (e.g., Visualforce® Android® Studio™ IDE, Apple® iOS® SDK, etc.). The term "platform-specific" may refer to the platform implemented by the user system 12 and/or the platform implemented by the database system 16. In embodiments, the environment 205 may be the Force.com IDE®, provided by salesforce.com, inc. of San Francisco, Calif.

Suitable implementations for the OS, databases, environment 205, and applications 210, as well as the general functionality of the user system 12 are known or commercially available, and are readily implemented by persons having ordinary skill in the art, particularly in light of the disclosure herein. However, the environment 205 may also include a version control system (or portion thereof) that is implemented using blockchain technology in accordance with the various embodiments discussed herein.

Typical software development platform models have evolved to support highly decentralized workflows through a distributed version control system (VCS), such as GIT, Mercurial, and the like. These models may allow developers to work remotely by providing a complete view of source code on their own client devices. While this may free developers to work when and wherever they please, enforcing governance on changes in such systems may become complicated and cumbersome since the source code is taken to be a complete system of record for a delivered product. In order to maintain certain derived invariants on top of those that constitute code for a software release, various embodiments provide tamper-resistant mechanisms to express invariants that can be validated locally with constraints placed not only on the source code but also on the changes that can be applied to invariant rules for updating/editing source code.

Invariant rules for updating/editing source code may be particularly important to track and enforce, such as those governing schema evolution and API changes since API changes may impact various applications (e.g., applications used to access tenant data) that have built-in dependencies on those APIs (e.g., that rely on the APIs for accessing tenant data). Changes to the released interfaces for applications can break tenant integrations and should be avoided, even when such applications retain internal consistency after the changes are implemented or released. Conventional VCSs may store indexes associated with each version of source code, which may be used to revert back to an older version of released source code when a newer version includes code that breaks applications and/or includes other errors. However, even where indexes are used, the older versions of the source code are still subject to willful or inadvertent tampering, which would allow a developer to bypass the invariant rules without discovering there is an issue until released applications are installed and used by users. In various embodiments, violations of the invariant rules may be verifiable and enforceable during various software development stages, such as during a disconnected build process. In embodiments, a representation of the rules may be distributed to various developers that are working on particular projects or applications. Without distribution of the invariant rules, a developer might make changes to source code for a substantial period of time without realizing that their changes cannot be reconciled with the invariant rules.

Additionally, various embodiments provide that changes may be made monotonically on a branch of a revision control tree graph (also referred to as a "tree"). For example, when two or more developers make changes to source code that might be independently determined to be valid, if such changes are appended to a project or application tree in parallel, these changes might create an irreconcilable fork in the version history. This may result in two or more users installing different versions of the applications, where each version is based on a different fork in the tree. When these versions are merged together there would likely be a change that cannot coexist with one another and cannot be reconciled without affecting upgradeability for users. Accordingly, embodiments provide that changes should be made monotonically, by for example, requiring changes to be made sequentially and/or subject to a consensus algorithm.

In various embodiments, blockchain technologies may be used to ensure that source code and edit/update rules are tamper-resistant, distributed, and monotonic. A blockchain (e.g., blockchain 214) may be a distributed database that may maintain a list of ordered records called blocks (e.g., blocks 212), where each block comprises a link to a previous block in the blockchain. A blockchain may be visualized as a vertical stack of blocks where a first block (also referred to as a "genesis block") may serve as the foundation of the stack and a "height" of a block may refer to the distance of a block from the first block. Additionally, a "top block" or top-most block" may refer to a block that was the most recent addition to a blockchain.

In various embodiments, when a software artifact (e.g., artifact 313) is released to the public, the signing of the released artifact by a validation system (e.g., a user system and/or a database system acting as centralized source code repository) may append a block of log records of changes to a surface area of an application (e.g., application 210) and the publication of the blockchain. In embodiments, the validation system or another validation system may not allow a successor block to be appended to an already appended block, providing monotonicity. Since the previous blocks are signed and included in the blockchain, the validation system may also provide that the history of changes has not been altered, and therefore, tamper-resistant. However, since the blockchains may be made public and copied into local development workspaces along with tools that traverse the release history and compare it will an actively developed version of the source code to the application, the checks on the integrity of the application can be made incremental in a way that is completely centralized, completely distributed, or partially centralized and/or partially distributed.

Figure 3:
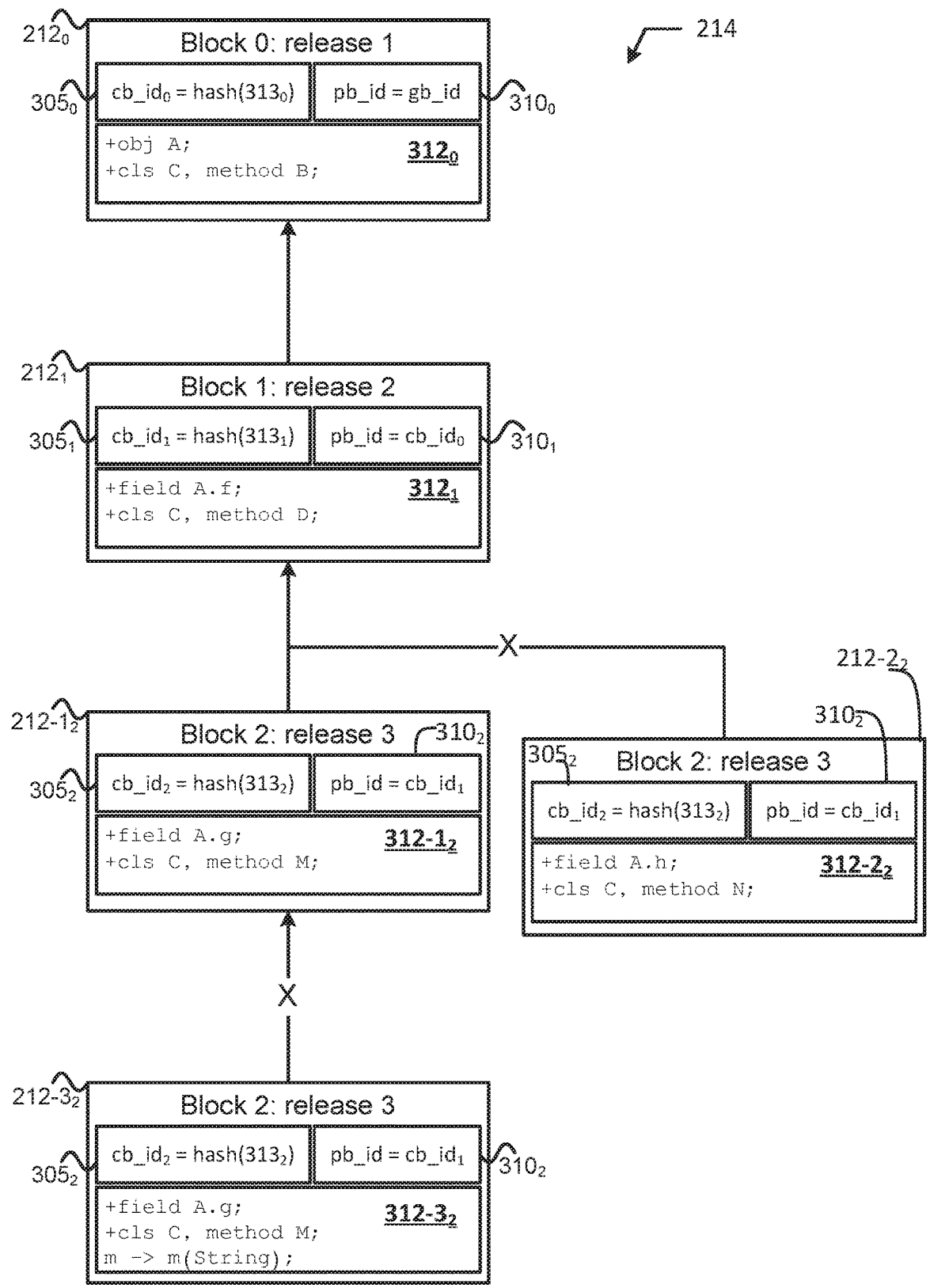
FIG. 3 illustrates example elements of blocks of a version control blockchain, in accordance with various embodiments.

As discussed previously, in embodiments the environment 205 may include or provide access to various tools that may enable a developer (e.g., users of the user systems 12) to generate artifacts 313 (see e.g., FIG. 3). The processor system 12A may implement the environment 205 (e.g., by executing program code and/or software modules of the environment 205) or a separate block generator (not shown by FIG. 2) to generate a block 212 (e.g., block $212_{n+1}$ as shown by FIG. 2) that includes, inter alia, artifacts 313 (e.g., as shown and described by FIG. 3); a current block identifier (cb_id); a previous block identifier (pb_id); and/or other like content or information. To generate a block 212, the processor system 12A may implement the environment 205 or block generator to serialize the artifacts 313 and encipher serialized artifacts 313 to obtain a cb_id and pb_id. In embodiments, the cb_id may be an identifier of a current block, which may be a hash that is generated using a cryptographic hash algorithm, such as a function in the Secure Hash Algorithm (SHA) 2 set of cryptographic hash algorithms (e.g., SHA-226, SHA-256, SHA-512, etc.), SHA 3, etc. Other hash algorithms or cryptographic functions may be used, such as any type of keyed or unkeyed cryptographic hash function and/or any other function discussed herein. The pb_id may be a hash that is generated using the same or similar cryptographic hash algorithm as is used to generate the cb_id, but may be used to reference a previous block 212 (referred to as a "parent block", "previous block", "top block", and the like). In this way, a sequence of IDs linking each block 212 to its parent block 212 may create a chain going back all the way to the genesis block 212.

The processor system 12A may implement the environment 205 to generate a request message 211 (also referred to as "message 211", "user-issued message 211", and the like) that includes a generated block 212, and may control the communications system 12E to send the message 211 to the database system 16 for inclusion of a generated block 212 in an identified blockchain 214. In embodiments, the message 211 (or the block 212) may also include a project/feature/application identifier (ID), a blockchain ID, a tenant or organization ID (org_id), a user ID (user_id), authentication credentials (e.g., key information, digital signatures, digital certificates, etc.), timestamp, and/or other like identifiers or information. The project/feature/application ID may be a globally unique ID across all blockchains 214.

Furthermore, the processor system 12A may digitally sign and/or encrypt the block 212 and/or the message 211 prior to transmission using, for example, an elliptic curve cryptographic (ECC) algorithm, Elliptic Curve cryptography Digital Signature Algorithm (ECDSA), Rivest-Shamir-Adleman (RSA) cryptography, Merkle signature scheme, advanced encryption system (AES) algorithm, a triple data encryption algorithm (3DES), any of the SHAs discussed previously, and/or the like.

In embodiments, the message 211 may be an HTTP message and the block 212 may be located in the header or body portion of the HTTP message. Other message types may be used to convey the message 211, such as a Session Initiation Protocol (SIP) message, a Secure Shell (SSH) message, or any of the Internet protocol messages discussed with regard to FIGS. 1A-1B and/or a proprietary or platform-specific message type used specifically for communicating between the user systems 12 and database system 16. Regardless of the message type and/or the encryption methods used, the message 211 may be sent to the database system 16 for verification of a block 212 and inclusion of the block 212 in the repository 251.

The network interface 20 of the database system 16 may obtain the message 211 and provide this message to the blockchain engine 250, which may extract the block 212 from the message 211 for analysis. The program code 26 may include blockchain engine 250, in addition to program code used for implementing the various functions of the database system 16. The program code 26, including program code of the blockchain engine 250 may be executed by the processor system 17. The blockchain engine 250 may be program code and/or software modules that obtains blocks 212 to be included in a blockchain 214, processes/evaluates the blocks 212 against one or more rules 215, and appends the potential blocks 212 to the blockchain 214.

In embodiments, the database system 16 may obtain multiple messages 211 including corresponding blocks 212 from multiple user systems 12. In the example shown by FIG. 2, a blockchain 214 may comprise blocks $212_0$ to $212_n$, where n is a number. The blockchain 214 may be referred to as a "version control blockchain" and the like. Users of the user systems 12 may each generate their own block $212_{n+1}$ for inclusion in the blockchain 214 after $212_n$. In such embodiments, the database system 16 may authenticate and/or verify the obtained blocks 212, and resolve conflicts among competing blocks 212 for inclusion in the blockchain 214. Verification and/or conflict resolution may include analyzing the contents of a block 212 and determining whether the block 212 complies with invariant rules 215 (also referred to as "rules 215").

The rules 215 (also referred to as "invariant rules 215", "block validation rules 215", "validation rules 215", "block verification rules 215", "verification rules 215", and the like) may be requirements or criteria for blocks 212 that are described within a data structure or database object. In conventional blockchain systems, a consensus algorithm may be used to validate a block to be added to a blockchain. For example, the bitcoin blockchain is a proof-of-work (PoW) system that requires identifying a block, which when hashed twice with SHA-256, yields a number smaller than a target value. The target value is a required number of leading zero bits in a block's hash.

In embodiments, the rules 215 may be used in addition to, or instead of a consensus algorithm. The rules 215 may be requirements or criteria that a block 212 must fulfill in order to be added to the blockchain 215. In some embodiments, some of the rules 215 may be requirements or criteria that the artifacts 313 must satisfy before a block 212 can be added to the blockchain 214. These types of rules 215 may be referred to as "format rules", "form rules", and the like. For example, form rules 215 may include various formatting, naming conventions, function types, etc. that must be included in the artifacts 313. In embodiments, the format rules 215 may include executable code, which can include software modules or algorithms (e.g., analysis techniques/functions, system rules, policy definitions, etc.) that analyze the artifacts 313 for format issues and/or release compatibility issues.

In some embodiments, some of the rules 215 may indicate requirements or criteria that a verifying device (e.g., the database system 16 in a centralized blockchain VCS and/or a user system 12 in a distributed blockchain VCS) must complete to process a block 212. These types of rules 215 may be referred to as "validity rules", "verification rules", "validation rules", and the like. In embodiments, the validity rules 215 may include executable code, which can include software modules or algorithms (e.g., hash algorithms, analysis techniques, etc.) that should be applied to a block 212 during a verification procedure. Verification rules 215 may include, for example, determining whether a pb_id (or a deciphered pb_id) is in a proper form and/or correctly points to a previous block 212, determining whether a successor or parent block 212 (e.g., block $212_n$) has already been created for a current block 212 (e.g., block $212_{n+1}$), determining whether source code changes, additions, and/or deletions for a released application indicated by a current block 212 would break backward compatibility, and/or other like rules. The various rules 215 discussed previously may be individually tailored for a specific blockchain 214.

As shown, the database system 16 includes a repository 251 that stores the blockchain 214 and rules 215 associated with the blockchain 214. The repository 251 may be a datastore or storage system that integrates changes implemented by concurrent application development and separates different versions of an application using blockchain technology. Although FIG. 2 shows the repository 251 including a single blockchain 214 and a single set of rules 215, in various embodiments the repository 251 may include a plurality of blockchains 214 and associated rules 215 where individual blockchains 214 may represent individual features, projects, and/or applications for one or more tenants. In some embodiments, the repository 251 may include an application tree structure comprising a plurality of blockchains 214, where each blockchain 214 is a branch of the application tree structure. In such embodiments, each blockchain 214 may include source code revisions produced/developed by an individual development teams or other like group of users. For example, a first blockchain 214 may be a first feature of an application developed by a first team to be released on a first release date, a second blockchain 214 may be a second feature of an application developed by a second team to be released on a second release date, and so forth. In embodiments, the repository 251 may be an MTC that stores a plurality of blockchains 214 in a multi-tenant fashion where various elements of hardware and software of the repository 251 may be shared by one or more customers or tenants.

In embodiments, upon receipt of a current block 212 (e.g., block $212_{n+1}$) from a user system 12A, the processor system 17 implementing the blockchain engine 250 may decrypt the message 211, and decipher the block 212 to obtain the information contained in the block $212_{n+1}$ (e.g., artifacts 313, cb_id, pb_id, etc.). The blockchain engine 250 may then send a request or query 216 to the repository 251 to obtain rules that correspond to the blockchain 214 that is associated with the deciphered block $212_{n+1}$. In response, the blockchain engine 250 may obtain an indication 217 that include the rules 215 that correspond to the deciphered block $212_{n+1}$, and may determine whether the contents of the block $212_{n+1}$ comply with the obtained rules 215. If the deciphered block $212_{n+1}$ is determined to comply with the rules 215, the blockchain engine 250 may send an indication 218 to the repository 251, which may include the block $212_{n+1}$ and an instruction/command to append the block $212_{n+1}$ to the blockchain 214 after the previous block (e.g., block $212_n$). After the block $212_{n+1}$ is added to the blockchain 214, the blockchain engine 250 may obtain an indication 219 indicating the addition of the block $212_{n+1}$ to the blockchain 214. In some embodiments, the indication 219 may indicate failures or errors in appending the block $212_{n+1}$ to the blockchain 214 if such a failure or error occurs. Once the indication 219 is obtained by the blockchain engine 250, the processor system 17 implementing the blockchain engine 250 may generate a response message 220, and instruct the network interface 20 to send the response message 220 (also referred to as "response 220") to the user system 12 that submitted the block 212. In embodiments, the response 220 may be any type of Internet protocol message, such as those discussed previously and/or a proprietary or platform-specific message type used specifically for communicating between the user systems 12 and database system 16.

If the blockchain engine 250 determines that the deciphered block $212_{n+1}$ does not comply with the rules 215, the processor system 17 implementing the blockchain engine 250 may generate a response message 220 that indicates that the block 212 was not appended to the blockchain 214 (e.g., a rejection message) and a reason for the rejection (e.g., noncompliance with validity rules 215, noncompliance with format rules 215, timing issues, processing issues such as decryption and/or deciphering failures, etc.). Examples of conflict resolution mechanisms performed by the blockchain engine 250 are shown and described with regard to FIGS. 3-5.

The response message 220 (also referred to as "response 220") may include user interface data 221. The user interface data 221 may comprise various data or data objects in a computer-readable form that can be compiled and rendered as a visual representation 222 by the output system 12D. The various data or data objects may be used to convey the indication 219 and/or a rejection messages discussed previously. In an example, the user interface data 221 may be one or more Extensible Markup Language (XML) documents, one or more JavaScript Object Notation (JSON) documents, and/or some other suitable data format that may be decoded and rendered by a container of environment 205 and/or a browser implemented by the user system 12. Once the response 220 is received by the user system 12, the processor system 12A implementing the environment 205 may extract the user interface data 221 and generate a visual representation 222, which may be displayed using the output system 12D.

Arrangement 200 shown by FIG. 2 may be an example of a centralized VCS for practicing the various embodiments discussed herein. In other embodiments, arrangement 200 may be a distributed blockchain VCS wherein one or more of the user systems 12 may act as validation systems. In such embodiments, the validation systems may include program code of the blockchain engine 250 and may perform the previously described functions of the blockchain engine 250. In such embodiments, the validation systems may also include a distributed version of the rules 215 for performing the various validity and format verification procedures discussed previously, as well as a local copy of the blockchain 214. In some embodiments, the various validity and format verification procedures may be performed in conjunction with a consensus algorithm, such as a PoW algorithm, a proof-of-stake (PoS) algorithm, proof-of-burn algorithm, proof-of-activity algorithm, proof-of-capacity algorithm, a practical byzantine fault tolerance (PBFT) algorithm, a Ripple protocol based algorithm, and/or the like. A consensus algorithm may be used in a distributed blockchain VCS in order to, for example, adopt new rules 215 and/or change the rules 215, or to validate the identities of the users of the user systems 12.

In an example of a distributed blockchain VCS, a user systems 12 may generate a block $212_{n+1}$ and message 211 in a same or similar manner as described previously. The user system 12 may then broadcast the message 211 to one or more validation systems, such as whitelisted user systems 12, user systems 12 with special or administrative privileges, and the like. Some or all of the validation systems may then separately verify the block $212_{n+1}$ by performing various verifications procedures using their local copy of the rules 215. In some embodiments, the validation systems may also use a consensus algorithm to verify the block $212_{n+1}$ (e.g., checking a number of processor cycles spent checking hashes in a PoW system, checking an amount of code/artifacts/schemas created or changed by a user in a PoS system, etc.). In such embodiments, the consensus algorithm to be used may be indicated in the message 211.

Using the validity/format verification procedures, the validation systems may generate a confirmation value that indicates that the block $212_{n+1}$ was properly verified, and may broadcast a confirmation message (e.g., similar to message 220) including the confirmation value to other validation systems. The other validation systems may then compare the confirmation value in the confirmation message with their own confirmation values generated using the validation procedures. If the confirmation values match, then the block $212_{n+1}$ may be considered verified, and once the block $212_{n+1}$ is verified, each validation system may append the block $212_{n+1}$ to the blockchain 214. Once the block $212_{n+1}$ has been properly validated by the validation systems, the block $212_{n+1}$ may be sent to other user systems 12 so that the block $212_{n+1}$ may be appended to their local version of the blockchain 214.

Additionally or alternatively, once the block $212_{n+1}$ has been properly validated by the validation systems, the block $212_{n+1}$ may be sent to the database system 16 for storage in the repository 251. Such embodiments may be referred to as a "partially distributed blockchain VCS" or a "partially centralized blockchain VCS."

FIG. 3 illustrates example elements of blocks 212 of a blockchain 214, in accordance with various embodiments. As shown, each block 212 may include a current block identifier (cb_id) 305, a previous block identifier (pb_id) 310, an artifact 313, etc.

Block 0 $212_0$ may be a genesis block of blockchain 214. The genesis block $212_0$ may be a common ancestor of all the blocks 212 in the blockchain 214. Genesis block $212_0$ may include source code or artifacts $313_0$ of an original release (e.g., release 1) of an application or portion thereof. In various embodiments, genesis block $212_0$ may include schema(s), object model(s), or some other type of a visual representation of artifacts 313 and/or visual representation of relationships between objects and/or database objects of the original release. The genesis block $212_0$ may also include a cb_$id_0$ $305_0$ and a pb_$id_0$ $310_0$. In embodiments, the cb_$id_0$ $305_0$ may include a hash of the contents of the genesis block $212_0$ (e.g., hash($313_0$) as shown by FIG. 3). In embodiments, the pb_$id_0$ $310_0$ may be a genesis block identifier (gb_id) when the block $212_0$ is a genesis block. In embodiments, the gb_id may be a hash of the contents of the genesis block $212_0$; predefined number; a value of zero; a timestamp of the source code, the artifact $313_0$; an org_id associated with a creator of the source code, the artifact $313_0$; a user_id associated with a creator of the source code, the artifact $313_0$; and/or the like.

In embodiments, the cb_$id_0$ $305_0$ and a pb_$id_0$ $310_0$ may be located in a header portion of the block $212_0$ and the artifact $313_0$ may be located in a body or payload portion of the block $212_0$. Although not shown by FIG. 3, in some embodiments, the block 212 may include an org_id, user_id, a feature/project/source code ID, a blockchain ID, authentication credentials, a timestamp, and/or other like information in the header portion or payload portion of the block $212_0$.

Block 1 $212_1$ may be a block including source code or artifacts $313_1$ of a second release (e.g., release 2) of the application or portion thereof. The artifacts $313_1$ may include changes to the original source code of the first release included in the genesis block $212_0$. For example, the artifact $313_1$ may include the additional field f of object A.

In some embodiments, block $212_1$ may include a visual representation of relationships between objects and/or database objects as altered by the artifacts $313_1$. The block $212_1$ may also include a cb_$id_1$ $305_1$, which may be a hash of the content of the block 212 (e.g., hash($313_1$) as shown by FIG. 3). The block $212_1$ may also include a pb_$id_1$ $310_1$, which may be a cd_id of a previous block 212 (e.g., hash($313_0$) or cb_$id_0$ $305_0$ as shown by FIG. 3). The pb_$id_1$ $310_1$ may link block $212_1$ to the genesis block $212_0$, which is indicated by the arrow between block 1 $212_1$ and block 0 $212_0$.

Similar to the genesis block $212_0$, in embodiments the cb_$id_1$ $305_1$ and a pb_$id_1$ $310_1$ may be located in a header portion of the block $212_1$ and the artifact $313_1$ may be located in a body or payload portion of the block $212_1$. Additionally, the block $212_1$ may include the same types of additional information as block $212_0$, such as an org_id, user_id, a feature/project/source code ID, a blockchain ID, authentication credentials, a timestamp, a root hash or value (e.g., gb_id), and/or other like information in the header portion or payload portion of the block $212_1$.

Blocks 2 $212\text{-}1_2$, $212\text{-}2_2$, and $212\text{-}3_2$ may be blocks that each include source code or individual artifacts $313_2$ of a third release (e.g., release 3) of the application or portion thereof. Each of the blocks $212\text{-}1_2$, $212\text{-}2_2$, and $212\text{-}3_2$ may be competing blocks that have been submitted by different user systems 12 for inclusion in the blockchain as a child of block $212_1$. Each of the blocks $212\text{-}1_2$, $212\text{-}2_2$, and $212\text{-}3_2$ may include their own corresponding artifacts $313_2$, schemas $313_2$, and cb_$ids_2$ $305_2$. Since the artifacts $313_2$ in the blocks $212\text{-}1_2$, $212\text{-}2_2$, and $212\text{-}3_2$ are different from one another, the cb_$ids_2$ $305_2$ of these blocks may also be different from one another. However, because blocks $212\text{-}1_2$, $212\text{-}2_2$, and $212\text{-}3_2$ are competing for the same spot in the blockchain 214, the pb_$ids_2 310_2$ in each block $212\text{-}1_2$, $212\text{-}2_2$, and $212\text{-}3_2$ may have the same value since they each point to the same previous block $212_1$. Similar to the previous block $212_1$, the pb_$id_2$ $310\text{-}1_2$ may link block $212\text{-}1_2$ to block $212_1$, which is indicated by the arrow between block 2 $212\text{-}1_2$ and block 1 $212_1$.

Similar to the genesis block $212_0$ and the previous block $212_1$, in embodiments the cb_$ids_2$ $305_2$ and a pb_$ids_2$ $310_2$ may be located in a header portion of the blocks $212_2$ and the artifacts $313_2$ may be located in a body or payload portion of the blocks $212_2$. Additionally, the blocks $212_2$ may include the same types of additional information as blocks $212_0$ and $212_1$, such as an org_id, user_id, a feature/project/source code ID, a blockchain ID, authentication credentials, a timestamp, and/or other like information in the header portion or payload portion of the block $212_1$. In some embodiments, the blocks $212_2$ may also include a root or top hash, such as the gb_id and/or the like.

The example shown by FIG. 3 includes an example "race condition" between the blocks $212\text{-}1_2$ and $212\text{-}2_2$. The race condition may be based on those blocks being submitted at a similar time, where, as an example, block $212\text{-}1_2$ has been validated or created prior to block $212\text{-}2_2$ (e.g., as indicated by a timestamp in block $212\text{-}1_2$). In this scenario, block $212\text{-}2_2$ may be rejected from being appended to the blockchain 214 (indicated by the "X" arrow in FIG. 3) since a block $212\text{-}1_2$ was already created as a successor block to block $212_1$.

The example shown by FIG. 3 also includes an invariant change/conflict condition between the blocks $212\text{-}1_2$ and $212\text{-}3_2$. The invariant change condition may be based on a user/developer attempting to alter source code, artifacts $313_2$ in a way that may break backwards compatibility with the previous block 212. In the example shown by FIG. 3, block 212-3$_2$ may include additional artifact 313-3$_2$ "m→m (String);". In this scenario, block 212-3$_2$ may be rejected from being appended to the blockchain 214 (indicated by the "X" arrow in FIG. 3) since the additional artifact 313-3$_2$ may result in backwards compatibility breakage.

Figure 4:
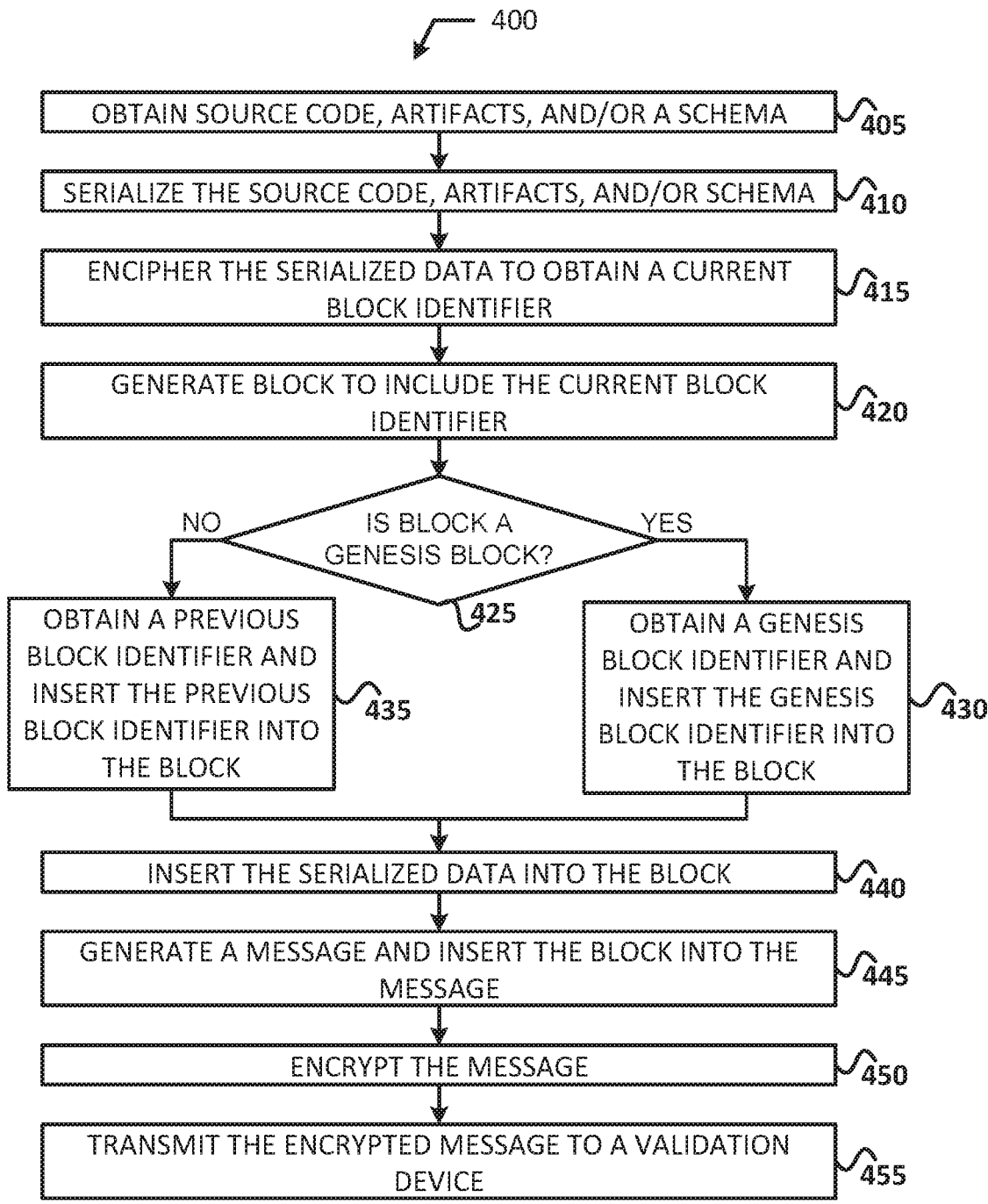
FIG. 4 illustrates a process for generating a block to be added to a version control blockchain, in accordance with various embodiments.
Figure 5:
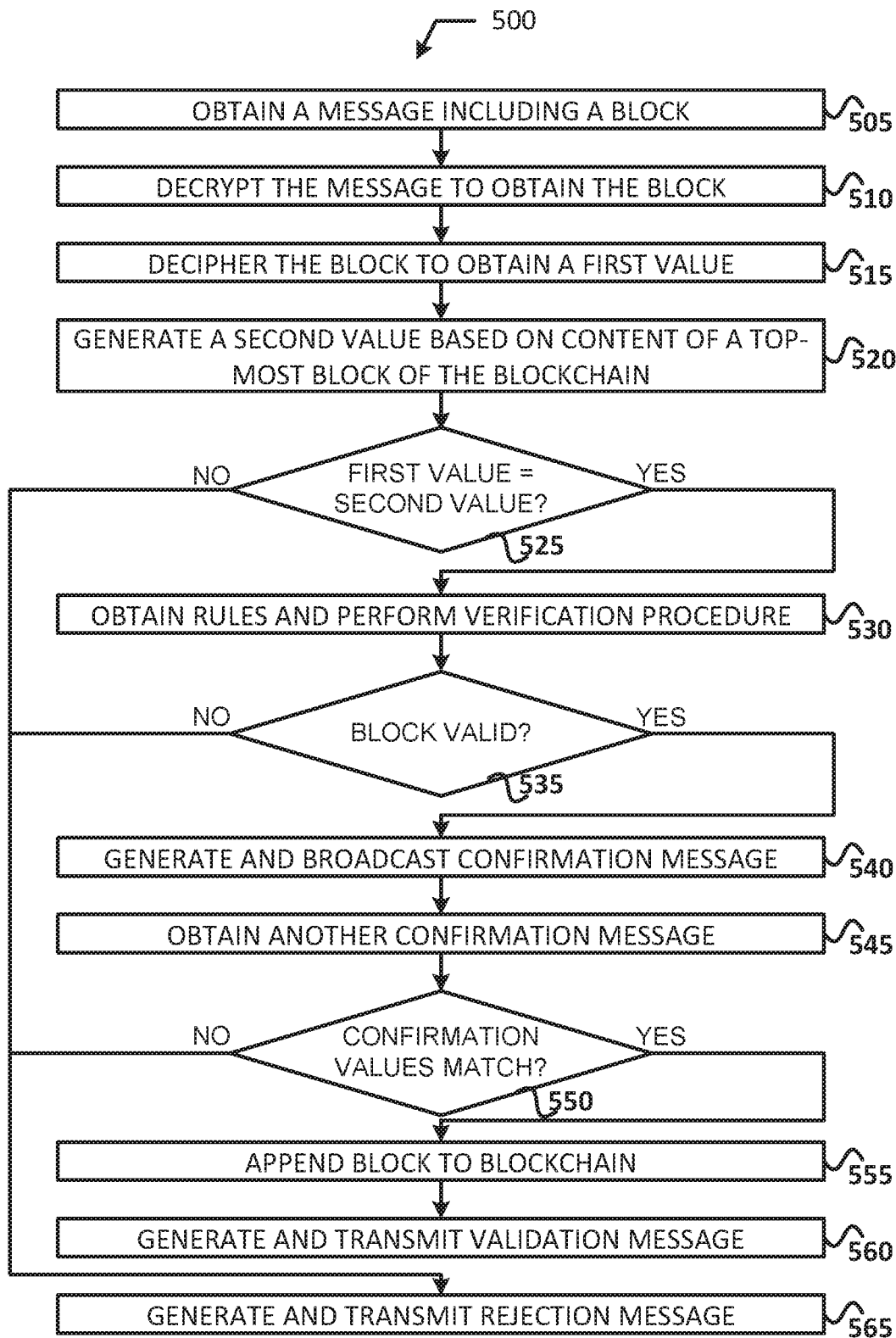
FIG. 5 illustrates a process for verifying blocks for inclusion in a version control blockchain.

FIGS. 4-5 illustrates processes 400-500, respectively, in accordance with various example embodiments. For illustrative purposes, the operations of processes 400-500 are described as being performed by a validation system, which may be the database system 16 and/or a user system 12 discussed with regard to FIGS. 1A-B and 2. However, it should be noted that other computing devices may operate the processes 400-500 in a multitude of implementations, arrangements, and/or environments. In embodiments, the validation system may include program code, which when executed by a processor system, causes the validation system to perform the various operations of processes 400-500. While particular examples and orders of operations are illustrated in FIGS. 4-5, in various embodiments, these operations may be re-ordered, separated into additional operations, combined, or omitted altogether.

FIG. 4 shows a process 400 for generating a block 212 to be added to a blockchain 214, in accordance with various embodiments. Process 400 may begin at operation 405, where a processor system of the validation system may obtain source code, artifacts 313. In embodiments where the validation system is the database system 16, the blockchain engine 250 implemented by the processor system 17 may obtain the source code, artifacts, object model(s), schema(s), etc. in a message sent by a user system 12 via the network interface 20. In such embodiments, the processor system 12A of the user system 12 may generate and send such a message by implementing environment 205. In embodiments where the validation system is the user system 12, the blockchain engine 250 implemented by the processor system 12A may obtain the source code, artifacts 313 from the environment 205 via an API, for example.

At operation 410, the processor system of the validation system may serialize the source code, artifacts, object model(s), schema(s), etc. to obtain serialized data. The serialization may include formatting or translating the source code, artifacts, object model(s), schema(s), etc. into a format that can be stored, for example in a database object, file, buffer, etc., and/or into a packet format for transmission over a network 14.

At operation 415, the processor system of the validation system may encipher the serialized data to obtain a cb_id 305. In embodiments, operation 415 may include inputting the serialized data into a hash function or other like algorithm, such as those discussed herein, that may output a cipher or code as a character string or number.

At operation 420, the processor system of the validation system may generate a block 212 to include the cb_id 305. At operation 425, the processor system of the validation system may determine whether the generated block 212 is a genesis block 212 or not. This may be based on an indication from within the source code, artifacts, object model(s), schema(s), etc., and/or an indication obtained through the environment 205. If at operation 425 the processor system of the validation system determines that the generated block 212 is a genesis block 212, then the processor system of the validation system may proceed to operation 430 to obtain a gb_id and insert the gb_id into the generated block 212. The gb_id may be the same or similar as the gb_id discussed previously. If at operation 425 the processor system of the validation system determines that the generated block 212 is not a genesis block 212, then the processor system of the validation system may proceed to operation 435 to obtain a pb_id 310 and insert the pb_id into the generated block 212. The pb_id 310 may be the same or similar as the pb_id 310 discussed previously. In embodiments, operations 420-435 may include inserting the cb_id 305, pb_id 310 or gb_id into a header portion of the generated block 212.

After performing operation 430 or 435, the processor system of the validation system may proceed to operation 440 to insert the serialized data into the generated block 212. The serialized data may be inserted into a body or payload portion of the generated block 212. In embodiments, operation 440 and/or operations 430-435 may also include inserting other information into the header or payload portion of the block 212, such as a timestamp, one or more identifiers discussed previously, a consensus algorithm, and the like. At operation 445, the processor system of the validation system may generate a message 211 discussed with regard to FIG. 2 and may insert the generated block 212 into the message 211. Additionally or alternatively, in various embodiments operation 445 may also include inserting other information into the header or payload portion of the message 211, such as a timestamp, one or more identifiers discussed previously, a consensus algorithm, and the like. At operation 450, the processor system of the validation system may encrypt and/or digitally sign the message 211 (or the contents of the message 211) according to known procedures.

At operation 455, the processor system of the validation system may control transmission of the encrypted message 211 to another validation system for verification of the block 212. In embodiments where the validation system is the user system 12, the blockchain engine 250 implemented by the processor system 12A may control the communications system 12E to transmit the message 211. In embodiments where the validation system is the database system 16, the blockchain engine 250 implemented by the processor system 17 may perform the verification procedures itself without transmitting the block 212 to another validation system. Additionally or alternatively, the blockchain engine 250 implemented by the processor system 17 may instruct the network interface 20 to transmit the message 211 to another validation system. An example verification procedure is shown and described with regard to FIG. 5. After performance of operation 455, process 400 may end or repeat as necessary.

FIG. 5 illustrates a process 500 for verifying a block 212 for inclusion in a version control blockchain 214, in accordance with various other embodiments. Process 500 may begin at operation 505, where a processor system of the validation system may obtain a message 211 including a block 212 to be added to a blockchain 214 (also referred to as a "potential block 212" and the like). At operation 510, the processor system of the validation system may decrypt the message 211 (or the contents of the message 211) to obtain the potential block 212.

At operation 515, the processor system of the validation system may decipher the potential block 212 to obtain a first value. In some embodiments, the first value may be a pb_id 310 included in a header portion of the potential block 212. In some embodiments, the first value may be a combination of various identifiers or information contained in the potential block 212, such as various identifiers/information discussed previously. In either of the aforementioned embodiments, deciphering the potential block 212 may involve the processor system determining whether the pb_id and/or other identifiers included in the potential block 212 properly point to a previous block 212. In embodiments where a suitable hash function is used to generate the pb_id, the pb_id may be or indicate a location of the previous block 212 (or the contents of the previous block 212), and deciphering the potential block 212 may involve the processor system obtaining the previous block 212 (or the contents of the previous block 212). Additionally, the deciphering may involve performing various deciphering and/or decoding tasks such as parsing, data transformations, serialization, etc., and/or other like tasks. At operation 520, the processor system of the validation system may generate a second value based on content contained in a top-most block 212 in the blockchain 214. In embodiments, the processor system may obtain the second value from the top-most block 212 based on the first value of the potential block 212. For example, when the first value is a pb_id 310 included in a header portion of the potential block 212, the second value may be a cb_id 305 included in a header portion of the top-most block 212.

At operation 525, the processor system of the validation system may determine whether the first value is equal to the second value. In this way, the processor system of the validation system may determine whether the potential block 212 is sufficiently linked to the top-most block 212. If at operation 525 the processor system of the validation system determines that the first value does not equal the second value, then the processor system of the validation system may proceed to operation 565 to generate and transmit a rejection message to the system that provided the potential block 212.

If at operation 525 the processor system of the validation system determines that the first value does equal the second value, then the processor system of the validation system may proceed to operation 530 to obtain rules 215 and perform a verification procedure on the block 212. The verification procedure may include determining whether the format of the serialized data contained in the potential block 212 complies with various formatting rules and/or determining whether complies with various compatibility rules, and the like. In some embodiments, the verification procedures may include de-serializing the serialized data. In embodiments, the serialized data may be obtained at operation 515 when the potential block 212 is deciphered. Additionally, in some embodiments operations 520 and 525 may be considered to be part of the verification procedures.

At operation 535, the processor system of the validation system may determine whether the potential block 212 is a valid block 212 or is otherwise properly verified is based on the verification procedures performed at operation 530. If at operation 535 the processor system of the validation system determines that the potential block 212 is not a valid block 212, then the processor system of the validation system may proceed to operation 565 to generate and transmit a rejection message to the system that provided the potential block 212.

If at operation 535 the processor system of the validation system determines that the potential block 212 is a valid block 212, then the processor system of the validation system may proceed to operation 540 to generate and broadcast a confirmation message to other validation systems. In some embodiments, the confirmation message may include a confirmation value. In embodiments the confirmation value may be a number, character, string, etc. indicating that the first and second values matched one another (see e.g., operations 515-525), while in other embodiments, the confirmation message may include the first value and/or the second value. In various embodiments, the confirmation message may include any information that indicates that the potential block 212 was properly verified by the validation system.

At operation 545, the processor system of the validation system may control receipt of another confirmation message generated by another validation system. In embodiments, the other confirmation message may be generated and broadcasted by the other validation system in a same or similar manner as discussed previously with regards to operation 505-540. In embodiments where the validation system is a user system 12, the blockchain engine 250 implemented by the processor system 12A may control the communications system 12E to receive a confirmation message. In embodiments where the validation system is the database system 16, the blockchain engine 250 implemented by the processor system 17 may control the network interface 20 to receive the confirmation message.

At operation 550, the processor system of the validation system may determine whether another confirmation value contained in the other confirmation message matches the confirmation value sent in the confirmation message at operation 540. If at operation 550 the processor system of the validation system determines that the other confirmation value contained in the other confirmation message does not match the confirmation value sent in the confirmation message, then the processor system of the validation system may proceed to operation 565 to generate and transmit a rejection message to the system that provided the potential block 212.

If at operation 550 the processor system of the validation system determines that the other confirmation value contained in the other confirmation message does match the confirmation value sent in the confirmation message, then the processor system of the validation system may proceed to operation 555 to append the potential block 212 to the blockchain 214. In embodiments where the validation system is the database system 16, the blockchain engine 250 implemented by the processor system 17 may provide the potential block 212 to a repository 215 with an instruction to add the potential block to the blockchain 214 stored in the repository 215. In embodiments where the validation system is a user system 12, the blockchain engine 250 implemented by the processor system 12A may append the potential block 212 to a local stored version of the blockchain 214. In some embodiments, the local version of the blockchain 214 may be stored in a local source code repository, which may be the same or similar as repository 215 discussed previously.

At operation 560, the processor system of the validation system may generate and transmit a validation message to the system that provided the potential block 212 and/or other systems in the network. In some embodiments, such as in centralized blockchain VCS implementations, the validation message may simply service as confirmation by indicating that the potential block 212 was added to the blockchain 214. In some embodiments, such as in distributed blockchain VCS and/or partially distributed blockchain VCS implementations, the validation message may serve as an instruction to other systems in the network to add the potential block 212 to their local version of the blockchain 214. After performance of operation 560 or operation 565, process 500 may end or repeat as necessary.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable media (NTCRM) comprising instructions to implement a version control blockchain wherein execution of the instructions by at least one processing device is to cause the at least one processing device to:
   obtain source code or an artifact associated with the source code;
   serialize the source code or the artifact to obtain serialized data;
   encipher the serialized data to obtain a current block identifier (cb_id);
   generate a block to include the cb_id and another identifier,
      the other identifier being a previous block identifier (pb_id) of a previous block in the version control blockchain when the generated block is not a genesis block, and
      the other identifier being a genesis block identifier (gb_id) when the block is the genesis block, the gb_id being a predefined number, a value of zero, a timestamp of the source code or the artifact, an organization identifier associated with a creator of the source code or the artifact, a user identifier associated with a creator of the source code or the artifact, or a combination thereof; and
   add the generated block to the version control blockchain, wherein, to add the generated block to the version control blockchain, execution of the instructions is to cause the at least one processing device to:
      generate a message to include the generated block;
      encrypt the message after insertion of the block into the message; and
      transmit the encrypted message to another device for validation prior to addition of the block to the version control blockchain.

2. The one or more NTCRM of claim 1, wherein, when the generated block is not a genesis block, execution of the instructions is to cause the at least one processing device to:
   insert the other identifier into the block upon generation of the block.

3. The one or more NTCRM of claim 2, wherein execution of the instructions is to cause the at least one processing device to:
   insert the enciphered serialized data and the other identifier into a header section of the block;
   insert the serialized data into a payload section of the block; and
   insert an indication of a consensus algorithm into the header section or the payload section.

4. The one or more NTCRM of claim 2, wherein the pb_id comprises enciphered content of the previous block.

5. The one or more NTCRM of claim 1, wherein execution of the instructions is to cause the at least one processing device to:
   obtain another message;
   decrypt the other message to obtain another block;
   validate the other block;
   add the other block to the version control blockchain when the other block is properly validated.

6. The one or more NTCRM of claim 5, wherein, to validate the other block, the set of instructions, execution of the instructions is to cause the at least one processing device to:
   obtain a obtain a first value from the other block;
   generate a second value based on a top-most block of the version control blockchain; and
   indicate that the other block is valid when the first value is equal to the second value.

7. A database system to implement a blockchain version control system, the database system comprising:
   a network interface to obtain a message from a user system, the message comprising a potential block to be added to a version control blockchain and an indication of a consensus algorithm to be used to verify contents of the potential block, contents of the potential block comprising source code, an artifact associated with the source code, or a schema associated with the source code; and
   a processor system to:
      decipher the potential block to obtain the contents of the potential block,
      obtain an identifier from the potential block, wherein the other identifier is a previous block identifier (pb_id) of a previous block in the version control blockchain when the previous block is not a genesis block, and the identifier is a genesis block identifier (gb_id) when the previous block is a genesis block;

the gb_id being a predefined number; a value of zero: a timestamp of the source code, the artifact, or the schema; an organization identifier associated with the creator of the source code, the artifact, or the schema; a user identifier associated with the creator of the source code, the artifact, or the schema; or a combination thereof, obtain a current block identifier (cb_id) from a topmost block in the version control blockchain, the cb_id being enciphered serialized data of a previous version of the source code, the artifact associated with the source code, or the schema, verify the contents of the blockchain according to the consensus algorithm, wherein, to verify the contents of the blockchain, the processor system is to: declare the potential block to be properly verified when the pb_id is substantially identical to the cb_id according to the consensus algorithm, and add the potential block to the version control blockchain when the contents of the block are properly verified.

8. The database system of claim 7, wherein the processor system is to:

decrypt the potential block to obtain the pb_id in a header portion of the potential block, wherein the pb_id in the potential block comprises a hash value of a previous block.

9. The database system of claim 7, wherein the processor system is to:

generate a rejection message to indicate failure to add the potential block to the version control blockchain when the potential block is not properly verified.

10. The database system of claim 7, further comprising:
a source code repository implemented by a data storage device, wherein the source code repository is to store the version control blockchain.

11. The database system of claim 10, wherein, to add the potential block to the version control blockchain, the processor system is to:

provide the potential block to the source code repository; and instruct the source code repository to append the potential block to the version control blockchain.

12. The database system of claim 10, wherein the processor is to:

obtain block verification rules from the source code repository; and verify the contents of the blockchain according to the consensus algorithm and the obtained block verification rules.

13. The database system of claim 12, wherein the block verification rules comprise format rules, and wherein, to verify the potential block, the processor system is to:

implement an analysis function to determine whether the contents of the potential block comply with the format rules.

14. A user system to implement a blockchain version control system, the user system comprising:

a processor system to implement an environment for developing an application, the environment being operable to:

obtain, based on one or more user inputs, source code, an artifact associated with the source code, or a schema associated with the source code, serialize the source code, the artifact, or the schema to obtain serialized data;

encipher the serialized data to obtain a current block identifier (cb_id), obtain another identifier, the other identifier being a previous block identifier (pb_id) of a previous block in a version control blockchain or a genesis block identifier (gb_id) when no previous block exists, the gb_id being a predefined number, a value of zero, a timestamp of the source code or the artifact, an organization identifier associated with a creator of the source code or the artifact, a user identifier associated with a creator of the source code or the artifact, or a combination thereof, and generate a block to include the cb_id, the other identifier, and the serialized data;

generate a message to include the generated block;

encrypt the message after insertion of the block into the message; and a communications system to transmit the encrypted message to a validation system for inclusion in a version control blockchain.

15. The user system of claim 14, wherein the processor system is to implement the environment to:

insert the cb_id and the other identifier into a header section of the block; and insert the serialized data into a payload section of the block.

16. The user system of claim 15, wherein the processor system is to implement the environment to:

generate the message after insertion of the other identifier and the cb_id into the block.

17. The user system of claim 14, wherein the processor system is to implement the environment to:

obtain another message;

decrypt the other message to obtain contents of another block in the other message;

verify the contents of the other block;

add the other block to a locally stored version of the version control blockchain when the other block is properly verified.

18. The user system of claim 17, wherein, to verify the contents of the other block, the processor system is to implement the environment to:

obtain another pb_id from a header portion of the other block;

obtain another cb_id from a header portion of a top-most block of the version control blockchain; and indicate that the other block is valid when the other pb_id is equal to the other cb_id.

* * * * *